Nov. 28, 1933.    G. E. HOWARD    1,937,321
APPARATUS FOR MAKING GLASS
Filed Jan. 16, 1933    2 Sheets-Sheet 2

Inventor:
George E. Howard
by Brown & Parham
Attorneys

Witness:
W. B. Thayer.

Patented Nov. 28, 1933

1,937,321

UNITED STATES PATENT OFFICE 1,937,321

APPARATUS FOR MAKING GLASS

George E. Howard, Butler, Pa., assignor to Hartford-Empire Company, Hartford, Conn., a corporation of Delaware Application January 16, 1933. Serial No. 651,964

22 Claims. (Cl. 49—54)

This invention relates to apparatus for the making of glass and more particularly to a tank type of glass making furnace wherein certain novel improvements are included, providing for a furnace construction having a longer life as regards previously known types of furnaces and one in which glass of uniform good quality is produced.

Among the objects of the present invention are to produce a furnace of the type employing a U-shaped flame for supplying combustion generated heat to the glass in which provision is made for limiting the extent of flame travel to protect the bridge wall against unduly rapid deterioration due to the direct scrubbing action of the flame and due to the bridge wall being exposed to contact with glass at too high temperatures.

A further object of the invention is to provide in connection with the furnace of the character above set forth a hollow roof arch portion for controlling the temperatures of the glass in corresponding portions of the tank, particularly in those portions adjacenct to the bridge wall in the melting and refining chamber.

A further object of the invention is to provide for controllably conditioning the glass in the tempering chamber on the opposite side of the bridge wall from the melting and refining chamber.

A further object of the invention is to provide automatic means properly to control either the adding or abstracting of heat to or from the glass in the tempering chamber.

A further object of the invention is to provide for the use of air primarily for cooling the bridge wall and thereafter for controlling temperatures in the tempering chamber.

A further object of the invention is to provide for the use of air primarily for cooling a portion of the roof arch and thereafter for controlling temperatures in the tempering chamber.

A further object of the invention is to provide a construction for the three-fold use of air, first, in cooling the bridge wall, second, in cooling the portion of the roof arch over a part of the melting and refining chamber adjacent to this bridge wall, and third, for controlling temperatures in the tempering chamber.

Other and more specific objects of the present invention will become apparent from a reading of the following specification and appended claims when taken in connection with the accompanying drawings in which:

Referring now to the accompanying drawings, and particularly to Figs. 1 to 5 thereof, there is illustrated a tank type furnace supported upon a plurality of masonry piers 1 through the intermediation of a structural metal frame work including substantially longitudinally extending beams 2 and transversely extending beams 3. As shown, the furnace includes a bottom generally indicated at 4, ends 5 and 6, side walls 7 and 8, and a main crown generally indicated at 9. The tank thus constructed is adapted to contain a bath of molten glass generally indicated at 10, the bath being normally maintained at a constant level 11 which may be considered the normal level for the glass in the tank. The tank is provided with a bridge wall, generally indicated at 12, dividing it into a melting and refining chamber 13 and a tempering chamber 14. These chambers communicate through a sub-merged throat passage 15 through which the glass may pass from the melting and refining chamber 13 to the tempering chamber 14.

Means are provided for the supplying of glass making materials to the tank. As illustrated, such means include conventional type dog houses 16, (Fig. 2), one of which is shown at each side of the tank communicating with a portion of the melting and refining chamber 13 remote from the bridge wall 12.

Means are also provided for withdrawing the finished glass from the tempering chamber of the tank, such means being illustrated as a forehearth 17 of any suitable type with which may be associated an automatic glass feeder or which may communicate with any desired means for the making of sheet glass in any conventional way, or means for the drawing of the glass into tubing or cane, or which may communicate with a suction gathering pool used in the making of glass articles by the well known suction process. The use, or uses, to which the glass is put forms no part of the present invention and hence has not been particularly illustrated.

Figures 2, 3, 4, 5, 6, 7:
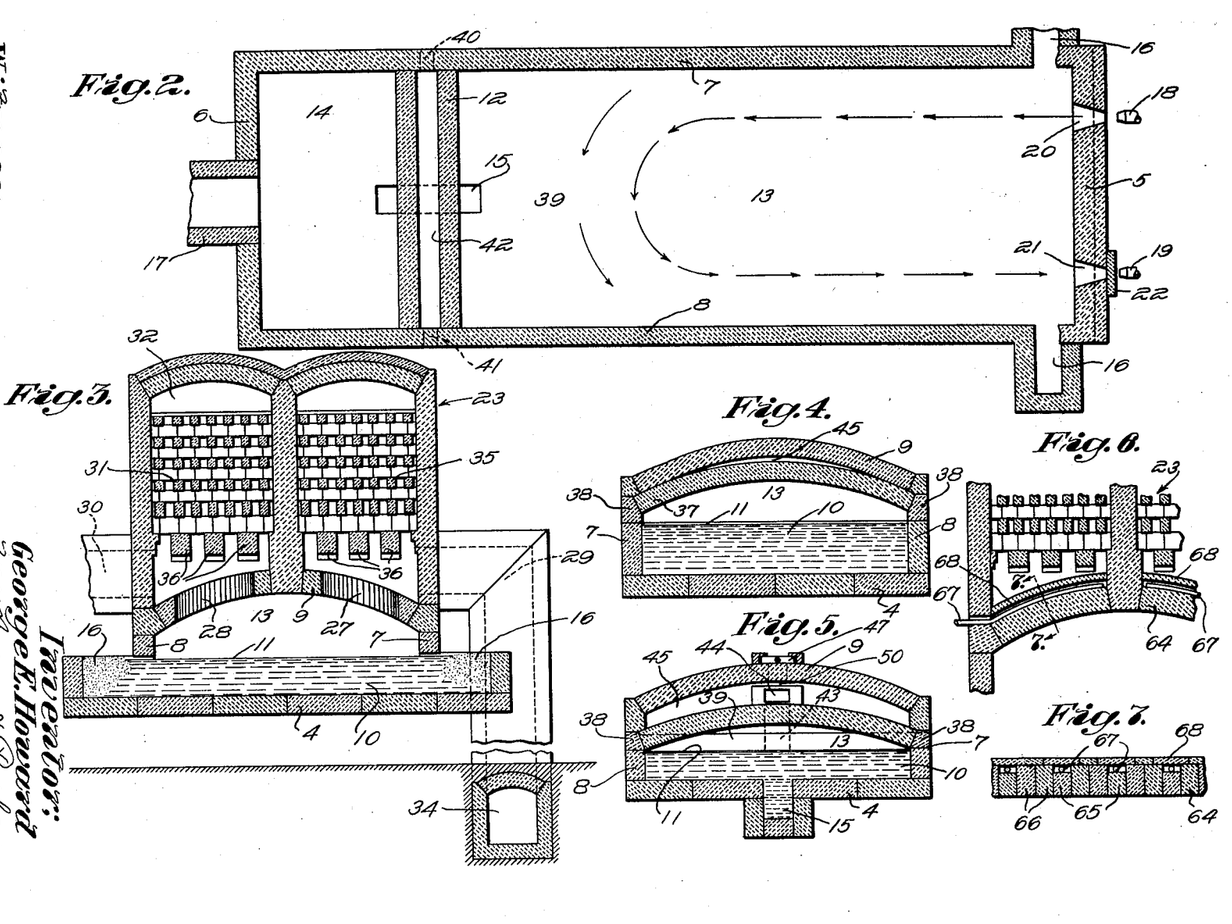
Fig. 2 is a view in horizontal section of the furnace taken substantially on the line 2—2 of Fig. 1.
Fig. 3 is a view in vertical section taken substantially on the line 3—3 of Fig. 1.
Fig. 4 is a view in vertical section taken substantially on the line 4—4 of Fig. 1.
Fig. 5 is a view in vertical section taken substantially on the line 5—5 of Fig. 1.
Fig. 6 is a fragmentary view substantially in vertical section taken on a plane at right angles to the plane of the section of Fig. 1 and showing a construction of cooling means for the roof arch of the furnace.
Fig. 7 is a fragmentary view in section on the line 7—7 of Fig. 6.

Means are provided for supplying fuel to the melting and refining chamber 13 of the tank for supplying the necessary heat thereto by combustion. As shown, there are provided burners 18 and 19 adapted to project fuel into the chamber 13 through the ports 20 and 21 respectively. Closure means are provided for alternately blocking off ports 20 or 21, according to the direction of firing. As shown in Fig. 2, the port 21 is shown blocked off by the closure 22. Such means may be operated in any desired manner, for example by some automatic means (not shown).

Figures 1, 8:
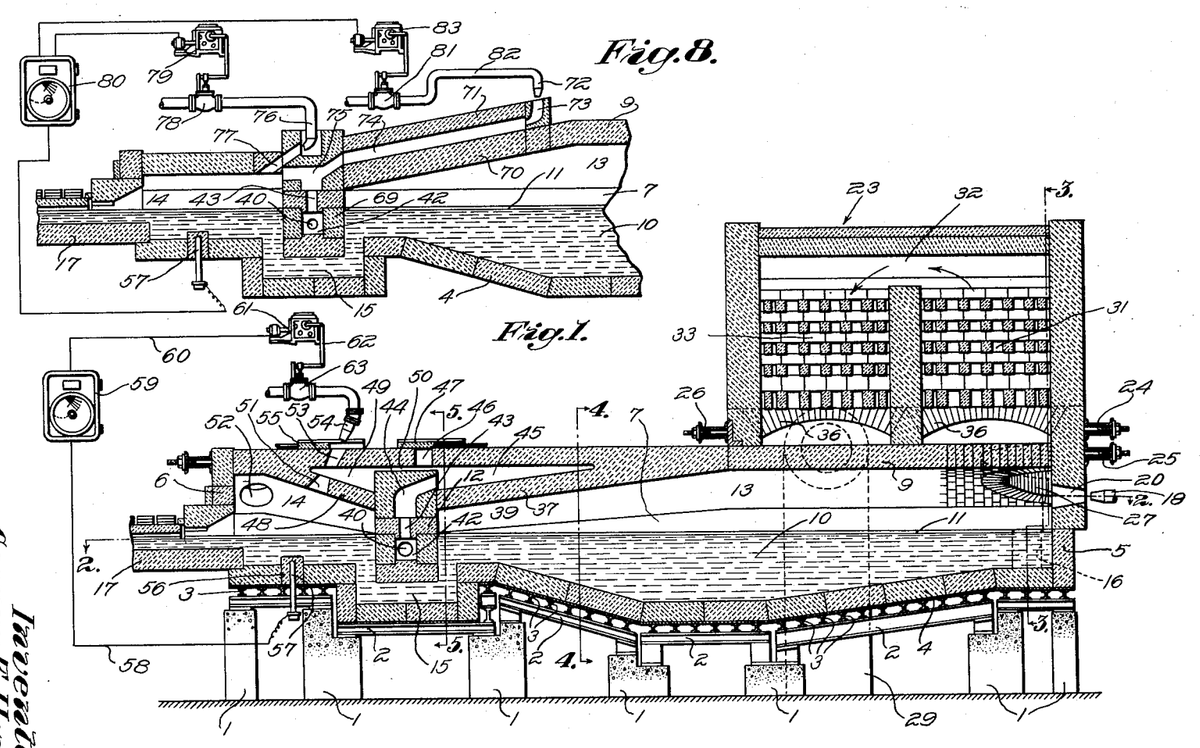
Figure 1 is a view in vertical longitudinal section of one embodiment of my device, a control system therefor being shown diagrammatically.
Fig. 8 is a view in vertical longitudinal section similar to the left hand portion of Fig. 1 showing a modified form of my invention.

Suitable heat recovery means are preferably associated with the tank for recovering at least a part of the heat of the exit gases and using this heat for the preheating of the incoming air. Such means may be of the recuperative or regenerative type. I have chosen to show, however, regenerators generally indicated at 23 built up above a portion of the crown 9 over a part of the melting and refining chamber 13. The manner of support of these regenerators forms no part of the present invention and hence will not be particularly described except to say that the regenerators may be at least in part supported from the structural members 24, 25 and 26 (Fig. 1). The regenerators communicate with the flame space in the chamber 13 through ports indicated at 27 and 28 and with a stack (not shown) through passages 29 and 30, suitable means (not shown) being provided for controlling the reversal of the directions of flame travel. As illustrated in Figs. 1 and 2, the products of combustion passing through the ports 28 will pass through the regenerator checkers 31 in an upward direction, thence through the cross passage 32, thence downward through the regenerator checkers 33 and thence outward through the stack passage 30. Incoming air will be conducted to the stack passage 29 from the underground duct 34 (Fig. 3), thence upward and inward through the passage 29 and thence through the regenerator checkers indicated at 35 (Fig. 3) to the port 27. It will be understood that the regenerator is symmetrically constructed so that the rear section seen at the right in Fig. 3 will be constructed in the same way as that illustrated in Fig. 1. As shown the regenerator checkers are supported on longitudinally extending arches 36 which may be supported in any suitable manner. The flame in the chamber 13 will be U-shaped as indicated by the arrows in Fig. 2.

Means are provided for restricting the length of travel of the flame, and particularly the extent to which the bight of the U-shaped flame approaches the bridge wall 12. For this purpose there is provided, as shown in Figs. 1, 4 and 5, a supplemental arch portion 37 formed as a branch of the main furnace arch 9 and supported from suitable skew blocks 38, as illustrated in Figs. 4 and 5, these blocks forming a part of the side walls 7 and 8. The arch 37 is constructed so that its lower surface gradually approaches the normal level 11 of the molten glass in the tank in the direction of the bridge wall 12. This coupled with the complete separation in the space above the glass between the chamber 13 and 14, effected by the bridge wall 12, provides a sort of dead air space or pocket 39 which serves as a sort of resilient buffer against the flame passage toward the bridge wall and thus serves to limit the extent of flame travel in this direction. This in practice provides for a zone, beneath the arch portion 37, of gradually reducing temperature in the glass as it approaches the bridge wall 12, which has the practical effect of subjecting the bridge wall to contact only with glass at a materially lower temperature than the glass in other portions of the melting and refining chamber 13, for example that substantially centrally of the chamber in the deeper zone thereof, as seen in Fig. 1. This construction provides for a much longer life for the bridge wall than would otherwise be attainable.

The bridge wall 12 is provided with means for keeping it cool, which is accomplished by forming it hollow, as illustrated in Fig. 1, and providing openings 40 and 41 (Fig. 2) communicating between the hollow space 42 within the bridge wall and a source of cooling medium, here illustrated as the atmosphere. Air, or some other cooling medium, may be supplied to the interior of the bridge wall either by depending upon thermo-siphon circulation or by any suitable forced draft means, such means not being particularly shown in the accompanying drawings, but being of any desired character. Air may pass from the interior space 42 in the bridge wall 12 through a vertical passage 43 and thence through an angular passage 44 to a hollow space 45 intermediate the branch arch 37 and the main furnace arch 9. The air passing through the hollow space 45 will have the effect of withdrawing some heat from the arch 37, thus cooling it to a greater extent than other portions of the main furnace arch 9, so as to have a cooling action upon the glass in corresponding portions of the tank. This will augment the above described cooling of the glass as it approaches the bridge wall and assist in obtaining the results hereinbefore mentioned.

There is shown in Fig. 1, substantially above the bridge wall 12 an outlet passage 46 for the withdrawal of a desired proportion of the cooling air drawn into the bridge wall through the ports 40 and 41 and passing thence through the passages 43 and 44 to circulate in the hollow space 45. This port 46 is preferably controlled by a suitable damper means, here generally indicated at 47. This damper may be operated by any suitable means (not shown) either manual or automatic in character.

Above the glass in the tempering chamber 14 there is also constructed a branch arch 48 inclined downwardly in the direction of the bridge wall 12, and forming between it and the main arch 9 of the tank a hollow space 49. The bridge wall 12 thus acts as a skew for both the opposing arches 37 and 48 in taking the longitudinal thrust of these arches. The cooling air drawn into the bridge wall through the ports 40 and 41 and which has thereafter passed through the passages 43 and 44 and circulated through the hollow space 45 may be conducted either outwardly of the furnace through the port 46 or may pass through a narrow passage 50 between the top of the bridge wall 12 and the main arch 9 of the furnace to the space 49, whence it may pass through a port 51 in the branch arch 48 into the interior of the tempering chamber. This air becomes somewhat heated by contact with the refractory materials making up the walls of the several passages and chambers above described through which is passes and hence is materially above room temperature, so that if the air thus partially heated is directed upon the hot glass in the tempering chamber 14, the cooling effect thereof will not be unduly pronounced. This air may function, if desired, for the purpose of reducing the temperature of the glass in the tempering chamber when such action is desired. There is provided in connection with the tempering chamber 14 an outlet passage generally indicated at 52 through which air or combustion products, as hereinafter to be described, may be withdrawn to a stack or discharged in any desired manner, either by thermo-siphon circulation or by any desired type of induced circulation in a manner not shown.

Substantially opposite the port 51 in the branch arch 48, there is formed in the main arch 9 of the furnace, a burner port 53 into which is directed a burner 54 for supplying fluid fuel to mix with the air introduced into the chamber 14 as above described for supplying additional heat to this chamber when such heat is desired. As shown, the port 53 is provided with a damper 55 for closing this port when such additional heat is not desired.

It is contemplated that some suitable automatic control may be employed for controlling and maintaining at the desired magnitude the temperature of the glass in the chamber 14 so as to control the temperature of the glass withdrawn therefrom for use. For this purpose there is illustrated in Fig. 1 a block 56 formed in the floor of the tempering chamber 14 into which extends a temperature responsive device diagrammatically illustrated at 57. This device may be of any desired character, such for example as a thermocouple and may communicate through the conductors or other suitable means, generally indicated by the line 58 with an instrument indicated at 59, which may serve to record and/or indicate the temperatures existing at the point at which the thermoresponsive device 57 is located and may also serve through electric conductors, or other means indicated by the line 60, to control a valve operating mechanism generally indicated at 61. This mechanism may include a reversible motor provided with a speed reducing gearing or equivalent mechanism and coupled mechanically by the link 62 to the valve 63 which controls the supply of fuel admitted to the tempering chamber 14 through the burner 54. It is contemplated that the instrument 59 will be of such character and will be so connected with the valve controlling mechanism 61 and possibly also with some other mechanism (not shown) by which the damper 55 and/or the damper 47 are controlled that additional heat may be supplied to the tempering chamber 14 when necessary by the supplying of fuel through the burner 54, or alternatively, this fuel supply may be cut off and cooling air in the desired amount and rate may be supplied as above set forth through the port 51 to the chamber 14 for controllably cooling the glass.

In Figs. 6 and 7, I have shown a slight modification of the structure illustrated in the preceding figures described above, particularly as to the portion of the furnace arch beneath the regenerator. As shown in these two figures, the regenerator, generally indicated at 23 as in the preceding figures, is supported in any suitable manner above the roof arch of the furnace indicated at 64. This roof arch is formed of a plurality of refractory blocks, as best illustrated in Fig. 7, and is constructed in such a manner that it may be controllably cooled. For this purpose certain of the blocks 65 are of lesser thickness than the remaining blocks 66 to provide for the accommodation of pipes 67 for the introduction of a cooling medium. This cooling medium may be of any desired character and may be supplied from any suitable source through the pipes 67 which conduct it inwardly of the furnace to points adjacent to the center of the arch 64 and thence in a loop of the pipes (not shown) to the next adjacent pipes 67 by which the cooling medium is conducted away from the furnace. Above the blocks 65 and 66 there is disposed a layer of suitable material indicated at 68. It is contemplated that cooling means of this character may be used wherever necessary, particularly in the portion of the roof arch beneath the regenerators, which arch portion is subjected to a more severe heating than are other portions of the roof arch as heat is applied on both sides thereof.

Referring now to Fig. 8 in which I have shown a modified form of my device, there is illustrated a portion of a glass melting furnace corresponding in location to the left hand half of the furnace shown in Fig. 1. In this figure corresponding parts are similarly numbered. This form of the device differs from that above described in that the bridge wall, generally indicated at 69, is of a somewhat different construction. There are provided, however, a bridge wall of the same configuration as regards the glass bath 10 and also substantially the same cooling means therefor including air inlet ports, one of which is indicated at 40, through which air may pass to the hollow space 42. There is also provided the passage 43 constructed in substantially the same manner as the similarly numbered passage 43 of Fig. 1. The upper end of the bridge wall 69 and the portion of the roof of the tank adjacent thereto over the chambers 13 and 14 are, however, somewhat differently constructed. As shown in this figure, the main roof arch 9 is constructed with an inclined portion 70 corresponding generally as to location to the branch arch 37 of Fig. 1. In this case, however, the roof arch portion 70 is provided with cooling means comprising separately admitted air which is confined by a supplemental arch 71 constructed substantially parallel to and above the portion 70 of the roof arch. An air jet 72 is directed through a curved passage 73 to supply air to the space 74 between the arch portions 71 and 70. Air from the space 74 is conducted through the cross portion of the T-shaped passage 75 to the interior of the tempering chamber 14, the passage 43 communicating with the stem of the T. Thus the chamber 14 receives air drawn in through the bridge wall cooling port 40 and a port corresponding to the port 41 (not shown) and also receives a separate supply of air which has passed through the space 74, this air being forced therethrough under the influence of the air jet 72.

There is provided in conjunction with the tempering chamber 14, a burner generally indicated at 76, which is directed through a separate port 77 into the interior of the tempering chamber. Fuel passing to the burner 76 is controlled by a valve 78 which may be controlled by a valve operating mechanism 79, similar in construction and operation to the valve operating mechanism 61 and similarly controlled as by an instrument 80 in response to the temperature recorded by a thermoresponsive device 57 correspondingly located and constructed to the similarly numbered device 57 of Fig. 1.

In this instance, however, there is also provided automatic control for the air supply through the jet 72 and passing through the space 74 to cool the roof arch portion 70. For this purpose, a valve 81 is provided in the pipe 82 leading to the air jet 72 and is operated by a suitable operating mechanism 83 which may be similar to the valve operating mechanisms 61 and 79 and may be operated from the controlling device 80 in any desired manner.

In operation the device shown in Fig. 8 is somewhat more flexible than is that of Fig. 1, in that there is a separate control for the air cooling the roof arch portion 70 as opposed to the amount of cooling air passing through the bridge wall 69.

Suitable damper means (not shown) may be provided for controlling the air passing through the bridge wall both in this form of the device and in the form shown in Fig. 1, such means not being illustrated in the accompanying drawings.

It is contemplated that the air used in cooling the bridge wall 69 and/or that used in cooling the roof arch portion 70 will be employed in substantially the same way in regard to the temperature conditioning of the tempering chamber 14, as in the Fig. 1 form of the device which has been described above.

While I have referred to a device for melting and refining "glass" in the foregoing specification, and in the appended claims, I mean this term to be construed in its broad sense to cover any and all glass-like materials, as for example water glass, vitreous enamels, etc., rather than to be construed in any restrictive sense. The specification and claims are to be read accordingly.

While I have shown and described but two principal forms in which my invention may be embodied, it is contemplated that numerous changes may be made therein and that certain of the features illustrated and described may have independent utility. I do not wish to be limited, therefore, except by the scope of the appended claims, which are to be construed as broadly as the state of the prior art permits.

I claim:

1. Apparatus for making glass, comprising a tank type furnace for containing a bath of molten glass, a bridge wall separating the furnace into a melting and refining chamber and a tempering chamber and serving completely to separate these chambers above the normal level of the molten glass therein, a submerged passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for admitting fuel and preheated air to the space in said melting and refining chamber above the molten glass bath therein to create a flame directed toward said bridge wall from a zone adjacent to the portion of the tank to which the glass making materials are supplied, outlet means for the products of combustion adjacent to that portion of the tank to which the glass making materials are supplied, whereby a U-shaped flame is maintained in the tank, the bight of the U extending toward said bridge wall, and a roof arch for defining the top of the flame space in the melting and refining chamber at least a part of which adjacent to said bridge wall is nearer the normal level of the glass in the tank than other portions thereof, whereby the passage of the flame toward said bridge wall is restricted.

2. Apparatus for making glass, comprising a tank type furnace for containing a bath of molten glass, a bridge wall separating the furnace into a melting and refining chamber and a tempering chamber and serving completely to separate these chambers above the normal level of the molten glass therein, a submerged passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for admitting fuel and preheated air to the melting and refining chamber adjacent to the portion thereof at which the glass making materials are supplied, means for withdrawing products of combustion from the melting and refining chamber adjacent to the portion thereof at which the glass making materials are supplied, whereby the furnace is heated by a U-shaped flame, the bight of the U extending toward said bridge wall from the inlet and outlet points for the fuel and products of combustion respectively, means for utilizing at least a part of the heat of the outgoing products of combustion to preheat the incoming air, and a roof defining the top of the melting and refining chamber and having at least a portion thereof adjacent to said bridge wall sloping downwardly toward the normal level of the molten glass in the tank, whereby to limit the extent of flame travel toward said bridge wall and thereby to create a zone adjacent to said bridge wall in which the glass is at progressively lower temperatures to protect the bridge wall from unduly rapid deterioration from exposure to too high temperature glass.

3. Apparatus for making glass, comprising a tank type furnace for containing a bath of molten glass, a bridge wall separating the furnace into a melting and refining chamber and a tempering chamber and serving completely to separate these chambers above the normal level of the molten glass therein, a submerged passage beneath said bridge wall through which glass may pass from the melting and refining chamber to the tempering chamber, means for supplying glass making materials to the melting and refining chamber adjacent to the end thereof remote from said bridge wall, means for withdrawing finished glass from said tempering chamber, means for admitting fuel and preheated air to the melting and refining chamber at said remote end of the tank, means for withdrawing products of combustion from the melting and refining chamber at a point laterally offset from the point of introduction of the fuel and preheated air, regenerators associated with said tank for the transfer of a part of the heat of the outgoing products of combustion to the incoming air, and a roof arch covering the melting and refining chamber and having a portion thereof adjacent to said bridge wall constructed in a manner such as gradually to constrict the flame space above the bath of molten glass therein toward the bridge wall, whereby the gradually constricted portion of the flame space toward the bridge wall will serve to limit the extent of flame travel toward said bridge wall and will create a zone of decreasing temperature in the glass toward the bridge wall in the melting and refining chamber for thereby protecting the bridge wall against unduly rapid deterioration by hot glass.

4. Apparatus for making glass, comprising a tank type furnace for containing a bath of molten glass, a bridge wall separating the furnace into a melting and refining chamber and a tempering chamber and serving to completely separate these chambers above the normal level of the glass therein, a submerged throat passage beneath the said bridge wall through which glass may pass from the melting and refining chamber to the tempering chamber, means for supplying glass making materials to the melting and refining chamber adjacent to the end thereof remote from said bridge wall, means for withdrawing finished glass from said tempering chamber, regenerators associated with said tank and built up above said remote end of said melting and refining chamber, flue passages connecting said melting and refining chamber and said regenerators, burners directed into said remote end of said melting and refining chamber for supplying fuel thereto, whereby the furnace is adapted to be fired by a U-shaped reversible flame, the bight of the U extending toward said bridge wall, an arched roof over said melting and refining chamber, and a branch arch arranged adjacent to said bridge wall and extending part way toward said remote end effective gradually to constrict the flame space in the melting and refining chamber over the glass toward said bridge wall, whereby to create a substantially dead air pocket adjacent to said bridge wall to restrict the length of flame travel from said burners toward said bridge wall and thus to create a zone of progressively decreasing temperature in said melting and refining chamber toward said bridge wall.

5. Apparatus for making glass, comprising a tank type furnace for containing a bath of molten glass, a bridge wall at least partially separating the furnace into a melting and refining chamber and a tempering chamber, a submerged passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for admitting fuel and preheated air to the melting and refining chamber above the molten glass therein, means for withdrawing products of combustion therefrom, means for admitting a cooling medium to the portion of said bridge wall beneath the normal level of the glass in said tank for retaining the material of the wall sufficiently cool to prevent its unduly rapid deterioration, a hollow arch portion extending from said bridge wall over an adjacent portion of said melting and refining chamber, and means for conducting said cooling medium from the interior of said bridge wall to and through said hollow arch portion for controlling its temperature, whereby to create a cooling zone for the glass adjacent to said bridge wall and prevent contact therewith of glass at the high temperatures existing in other portions of said melting and refining chamber.

6. Apparatus for making glass, comprising a tank type furnace for containing a bath of molten glass, a bridge wall separating the furnace into a melting and refining chamber and a tempering chamber and serving completely to separate these chambers above the normal level of the molten glass therein, a submerged throat passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for admitting fuel and preheated air to the melting and refining chamber and for withdrawing products of combustion therefrom to create a U-shaped flame, the bight of the U extending toward said bridge wall, means for admitting a cooling medium to the portion of said bridge wall beneath the normal level of the molten glass in the tank, an arched roof over said melting and refining chamber and having a hollow portion adjacent to said bridge wall, the lower face of which approaches the normal level of the glass toward the bridge wall to provide a constricted flame space for limiting the path of the flame in the direction of the bridge wall, and means for conducting the cooling medium from the interior of the bridge wall to and through the hollow portion of said arch adjacent thereto, whereby to create a zone of progressively decreasing temperature in the glass as it approaches the bridge wall.

7. Apparatus for making glass, comprising a tank type furnace for containing a bath of molten glass, a bridge wall separating the furnace into a melting and refining chamber and a tempering chamber and serving completely to separate these chambers above the normal level of the glass therein, a submerged throat passage beneath said bridge wall through which the glass may pass from the melting and refining chamber to the tempering chamber, means for supplying glass making materials to the melting and refining chamber at a portion thereof remote from said bridge wall, means for withdrawing finished glass from said tempering chamber, means for admitting fuel and preheated air to the melting and refining chamber and for withdrawing products of combustion therefrom in such a manner as to create a U-shaped flame, the bight of the U being directed toward said bridge wall, a roof arch over said tank and having a portion above the melting and refining chamber and adjacent to said bridge wall which is hollow and which is constructed progressively closer to the normal level of the molten glass approaching the bridge wall, whereby to restrict the flame to a path spaced from said bridge wall, means for admitting atmospheric air to the portion of said bridge wall extending beneath the normal level of the molten glass in the tank, means for conducting the air so admitted from said bridge wall and directing it into the hollow portion of the roof arch above that portion of the melting and refining chamber adjacent to the bridge wall, and a controllable outlet for the cooling air from the hollow portion of the arch, said outlet being located adjacent to said bridge wall but out of alignment with the path of the cooling air passing from said bridge wall into the hollow portion of the arch, whereby a progressively cooler zone is created in the glass as it approaches said bridge wall.

8. Apparatus for making glass, comprising a tank type furnace for containing a bath of molten glass, a bridge wall separating the furnace into a melting and refining chamber and a tempering chamber and serving completely to separate these chambers above the normal level of the molten glass therein, a submerged throat passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for admitting fuel and preheated air to the melting and refining chamber and for withdrawing products of combustion therefrom so constructed and arranged as to create a U-shaped flame in said melting and refining chamber, the bight of the U being directed toward said bridge wall, a roof arch covering said melting and refining chamber and having a portion inclined downwardly toward said bridge wall whereby to constrict the space above the glass approaching the bridge wall for limiting the extent of flame travel in that direction by providing a substantially dead air space adjacent to said bridge wall, means for admitting atmospheric air to said bridge wall for cooling it at least as to the portion thereof projecting beneath the normal level of the glass in the tank, a hollow chamber formed in the inclined part of the roof arch over the melting and refining chamber adjacent to said bridge wall, and means for passing cooling air through said hollow chamber for cooling it, whereby to create a zone of progressively decreasing temperature in the melting and refining chamber approaching the bridge wall so that the glass coming into direct contact with the bridge wall will be at a materially lower temperature than that in the higher temperature zones of the melting and refining chamber.

9. Apparatus for making glass, comprising a tank type furnace for containing a bath of molten glass, a bridge wall at least partly separating the furnace into a melting and refining chamber and a tempering chamber, a submerged passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for supplying heat to the glass in said melting and refining chamber for melting the glass making materials and refining the glass therein, means for admitting air to the portion of the bridge wall beneath the normal level of glass in the tank for cooling the bridge wall and thereby imparting a certain amount of heat to the cooling air, and means for supplying the partially heated air from the interior of the bridge wall to the tempering chamber for use alternatively to cool the glass therein when such action is desired or for supporting combustion in the tempering chamber to supply heat thereto when it is desired to heat the glass in this chamber.

10. Apparatus for making glass, comprising a tank type furnace for containing a bath of molten glass, a bridge wall separating the furnace into a melting and refining chamber and a tempering chamber and serving completely to separate these chambers above the normal level of the glass therein, a submerged throat passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for supplying heat to the melting and refining chamber for melting the glass making materials and for refining the glass therein, means for admitting atmospheric air to the portion of the bridge wall extending beneath the normal level of the molten glass in the tank for cooling the bridge wall, means for employing the cooling air from the bridge wall which has been heated to some extent by heat transferred thereto from the bridge wall alternatively for cooling the molten glass in the tempering chamber or for supporting combustion in the tempering chamber for the supplying of heat thereto, and automatic means responsive to the temperature of the glass in the tempering chamber for selectively controlling the alternative cooling or supplying of heat to the glass in this chamber.

11. Apparatus for making glass, comprising a tank type furnace for containing a bath of molten glass, a bridge wall at least partly separating the furnace into a melting and refining chamber and a tempering chamber, a submerged throat passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for supplying heat to said melting and refining chamber to melt the glass making materials and to refine the glass therein, means for admitting atmospheric air to the portion of the bridge wall extending beneath the normal level of the glass in the tank for cooling it, means for discharging a selected proportion of the cooling air from the bridge wall to the atmosphere, and means for supplying the remainder of the cooling air from the bridge wall to the tempering chamber alternatively to cool the glass therein or to support combustion in the tempering chamber for supplying heat thereto according as it is desired to cool or heat the glass in the tempering chamber.

12. Apparatus for making glass, comprising a tank type furnace for containing a bath of molten glass, a bridge wall separating the furnace into a melting and refining chamber and a tempering chamber and serving completely to separate these chambers above the normal level of the molten glass therein, a submerged throat passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for supplying heat to the glass in the melting and refining chamber for melting the glass making materials supplied thereto and for refining the glass therein, means for admitting atmospheric air to the portion of the bridge wall extending beneath the normal level of the molten glass in the tank, a hollow chamber constructed in the roof arch of the tank above the portion of the melting and refining chamber adjacent to said bridge wall, means for conducting the cooling air from the interior of the bridge wall to this hollow chamber, a controllable outlet communicating between said hollow chamber in the roof arch of the tank and the atmosphere for the withdrawal of a selected proportion of the cooling air supplied to said hollow chamber from the interior of the bridge wall, a passage communicating between said hollow chamber and said tempering chamber for conducting the remainder of the cooling air from the bridge wall into the tempering chamber, means operative at desired times for supplying fuel to the tempering chamber to mix and burn with the air supplied thereto as aforesaid for the supplying of heat to the tempering chamber when desired, and an outlet from the tempering chamber for conducting therefrom products of combustion and air which has been supplied thereto as aforesaid.

13. Apparatus for making glass, comprising a tank type furnace for containing a bath of molten glass, a bridge wall at least partially separating the furnace into a melting and refining chamber and a tempering chamber, a submerged throat passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for supplying heat to the melting and refining chamber for melting the glass making materials supplied thereto and for refining the glass therein, means for admitting atmospheric air to the interior of the bridge wall in the portion thereof which extends beneath the normal level of the glass in said tank, a hollow crown portion over a part of the melting and refining chamber adjacent to said bridge wall, means for supplying controllable amounts of air through said hollow crown portion, whereby both the air supplied to the interior of the bridge wall and the air supplied to the hollow crown portion will be heated to a certain extent by cooling the portions of the tank with which they come in contact, and means for supplying both the air from the interior of the bridge wall and the air from said hollow crown portion to the tempering chamber alternatively to cool the glass in the tempering chamber or to support combustion therein for the supplying of heat thereto.

14. Apparatus for making glass, comprising a tank type furnace for containing a bath of molten glass, a bridge wall separating the furnace into a melting and refining chamber and a tempering chamber and serving completely to separate these chambers above the normal level of the glass therein, a submerged throat passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for admitting fuel and preheated air to said melting and refining chamber and for withdrawing products of combustion therefrom, the last named means being so constructed and arranged that a U-shaped flame will be created in the melting and refining chamber, the bight of the U extending toward said bridge wall, a roof arch covering the melting and refining chamber, a portion of which adjacent to said bridge wall being inclined downward toward the surface of the molten glass as it approaches the bridge wall to form a progressively restricted dead air space for limiting the extent of flame travel toward the bridge wall, means forming a hollow portion above said inclined portion of the roof arch adjacent to said bridge wall and above the melting and refining chamber, means for supplying cooling air through this hollow portion for cooling the inclined portion of the roof arch, whereby a zone of progressively decreasing temperature is created in the glass in the melting and refining chamber approaching the bridge wall, means for admitting atmospheric air to the interior of that portion of the bridge wall which extends beneath the normal level of the molten glass in the tank, means for conducting both the cooling air admitted to the interior of the bridge wall and the air supplied through said hollow portion of the roof arch to the interior of the tempering chamber, means operative when desired for admitting fuel to the interior of the tempering chamber, and automatic means responsive to the temperature of the glass in said tempering chamber for controlling the admission of fuel thereto and for controlling the admission of air through said hollow roof arch for thereby selectively heating or cooling the glass in the tempering chamber to bring it to the temperature desired for its subsequent use.

15. Apparatus for making glass, comprising a tank type furnace for containing a bath of molten glass, a bridge wall at least partially separating the furnace into a melting and refining chamber and a tempering chamber, a submerged passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for supplying heat to said melting and refining chamber for melting the glass making materials supplied thereto and for refining the glass therein, a roof arch above said tank and having a portion thereof above that portion of the melting and refining chamber adjacent to said bridge wall hollow, means for admitting atmospheric air to that portion of said bridge wall which extends beneath the normal level of the glass in said tank, means for conducting the air from the interior of the bridge wall into the hollow portion of said roof arch above the melting and refining chamber for creating a zone of decreasing temperature in the glass in the melting and refining chamber as it approaches said bridge wall, and means for conducting at least a portion of the cooling air from the hollow portion of the roof arch into said tempering chamber for controlling the temperature of the glass therein.

16. Apparatus for making glass, comprising a tank type furnace for containing a bath of molten glass, a bridge wall separating the furnace into a melting and refining chamber and a tempering chamber and serving completely to separate these chambers above the normal level of the molten glass therein, a submerged throat passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for supplying heat to the melting and refining chamber for melting the glass making materials supplied thereto and for refining the glass therein, a roof arch above said melting and refining chamber having a portion thereof adjacent to said bridge wall hollow, means for admitting atmospheric air to that portion of the bridge wall which extends beneath the normal level of the molten glass in the tank, means for conducting the cooling air thus admitted from the bridge wall into the hollow portion of the roof arch above the adjacent portion of the melting and refining chamber to create a zone of progressive cooling in the glass in that chamber as it approaches the bridge wall, means for supplying fuel to said tempering chamber, and means for conducting at least a portion of the air which serves to cool the bridge wall and said hollow portion of the roof arch to the tempering chamber to support combustion of the fuel thus supplied, whereby to supply heat properly to condition the glass in the tempering chamber.

17. Apparatus for making glass, comprising a tank type furnace for containing a bath of molten glass, a bridge wall at least partially separating the furnace into a melting and refining chamber and a tempering chamber, a submerged passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for supplying heat to said melting and refining chamber for melting the glass making materials supplied thereto and for refining the glass therein, a roof arch over said tank having a portion above the melting and refining chamber and adjacent to the bridge wall formed hollow, means for admitting air from the atmosphere to that portion of the bridge wall which extends below the normal level of the glass in the tank, means for passing air through the hollow portion of the roof arch, an inlet port into said tempering chamber communicating both with the space within the bridge wall to which air is admitted and with the hollow portion of the roof arch for supplying partially heated air to the tempering chamber, a burner for directing fuel into the interior of the tempering chamber, and an automatic control means responsive to the temperature of the glass in the tempering chamber and arranged to control said burner to cut off the supply of fuel so that the air supplied to the tempering chamber may reduce temperatures therein or alternatively to admit fuel to the tempering chamber through said burner to mix with the air supplied to the tempering chamber to supply heat thereto in order to bring the glass to the desired temperature for use.

18. Apparatus for making glass, comprising a tank type furnace for containing a bath of molten glass, a bridge wall separating the furnace into a melting and refining chamber and a tempering chamber and serving completely to separate these chambers above the normal level of the molten glass therein, a submerged passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, means for admitting fuel and preheated air to the space in said melting and refining chamber above the molten glass therein and for withdrawing products of combustion therefrom, the last named means being so constructed and arranged as to create a U-shaped flame in the melting and refining chamber, the bight of the U extending toward said bridge wall, a roof arch above said tank and having a hollow portion adjacent to said bridge wall above the melting and refining chamber, the lower wall of which is constructed to approach the normal level of the glass in the direction of the bridge wall for providing a progressively constricted dead air pocket to limit the extent of flame travel toward the bridge wall, means for admitting atmospheric air to the portion of said bridge wall beneath the normal level of the glass in the tank, means for passing air through the hollow portion of the roof arch, an air port communicating with said tempering chamber for conducting the partially heated air from the bridge wall and the hollow portion of the roof arch to the interior of the tempering chamber, and a controllable outlet port communicating with both the interior of the bridge wall and the interior of the hollow portion of the roof arch for the withdrawal of a controllable proportion of the air used for cooling these parts of the furnace, whereby a controllable amount of air is supplied to the tempering chamber for cooling the glass therein.

19. Apparatus for making glass, comprising a tank type furnace for containing a bath of molten glass, a bridge wall separating the furnace into a melting and refining chamber and a tempering chamber and serving completely to separate these chambers above the normal level of the molten glass therein, a submerged passage beneath said bridge wall through which glass may pass from the melting and refining chamber to the tempering chamber, means for supplying glass making materials to the melting and refining chamber at a portion thereof remote from said bridge wall, means for withdrawing finished glass from said tempering chamber, reversible means for admitting fuel and preheated air into said melting and refining chamber and for withdrawing products of combustion therefrom, the last named means being so constructed and arranged as to create a reversible U-shaped flame for supplying heat to melt the glass making materials and refine the glass in the melting and refining chamber, the bight of the U extending toward said bridge wall, a roof arch above said furnace having a portion above the melting and refining chamber adjacent to said bridge wall formed hollow and constructed with its lower wall sloping downward toward said bridge wall to create a progressively constricted flame space approaching the bridge wall and thereby to limit the extent of flame travel in the direction of said bridge wall, means for admitting atmospheric air to the interior of said bridge wall beneath the normal level of the molten glass in the tank, means for passing air through the hollow portion of the roof arch over the end portion of the melting and refining chamber adjacent to said bridge wall for thereby augmenting the action of the inclined portion of the roof arch in limiting the extent of flame travel to produce a zone of progressively decreasing temperature in the melting and refining chamber approaching the bridge wall, an air inlet port into the tempering chamber communicating both with the hollow portion of the roof arch and with the interior of the bridge wall, burner means for supplying fluid fuel to the tempering chamber, and automatic control means responsive to the temperature of the glass in the tempering chamber and constructed and arranged to operate said burner means for supplying fluid fuel to the interior of the tempering chamber to mix and burn with the air supplied thereto for supplying heat to the tempering chamber or alternatively to cut off the burner means so that the air supplied to the tempering chamber will be effective to cool the glass therein according as the glass in the tempering chamber requires the addition or abstraction of heat to bring it to the desired temperature.

20. A glass making furnace for containing a bath of molten glass and adapted at one portion thereof to receive glass making materials, said furnace having a bridge wall spaced from said portion and having an enclosed space above the glass therein between the bridge wall and the place at which glass making materials are received therein, said space being of relatively restricted area in vertical section adjacent to the bridge wall, and means for projecting a combustible mixture into the space adjacent to the place at which glass making materials are received and toward said relatively restricted portion of said space.

21. Apparatus for making glass, comprising a tank type furnace for containing a bath of molten glass, a bridge wall at least partialy separating the furnace into two chambers, means for admitting a cooling medium to said bridge wall to prevent its unduly rapid deterioration, a hollow roof arch portion extending from said bridge wall over an adjacent portion of one of said chambers, and means for conducting said cooling medium from the interior of said bridge wall to and through said hollow arch portion for controlling its temperature.

22. Apparatus for making glass, comprising a tank type furnace for containing a bath of molten glass, a bridge wall at least partially separating the furnace into a melting chamber and a tempering chamber, means for admitting air to said bridge wall to prevent its unduly rapid deterioration by heat and thereby for imparting a certain amount of heat to the cooling air, and means for supplying the partially heated air from the interior of the bridge wall to the tempering chamber for use alternatively to cool the glass therein when such action is desired or for supporting combustion in the tempering chamber to supply heat thereto when it is desired to heat the glass in this chamber.

GEORGE E. HOWARD.